United States Patent
Kuschel et al.

(10) Patent No.: US 12,404,791 B2
(45) Date of Patent: Sep. 2, 2025

(54) HEATING CONDUCTOR FOR AN EXHAUST GAS HEATER

(71) Applicant: Purem GmbH, Neunkirchen (DE)

(72) Inventors: Dietmar Kuschel, Murr (DE); Sandra Höckel, Esslingen am Neckar (DE); Christoph Illi, Baltmannsweiler (DE)

(73) Assignee: Purem GmbH, Neunkirchen (DE)

( * ) Notice: Subject to any disclaimer, the term of this patent is extended or adjusted under 35 U.S.C. 154(b) by 6 days.

(21) Appl. No.: 18/444,016

(22) Filed: Feb. 16, 2024

(65) Prior Publication Data
US 2024/0280039 A1   Aug. 22, 2024

(30) Foreign Application Priority Data

Feb. 17, 2023 (DE) .................. 10 2023 103 941.5
Mar. 8, 2023 (DE) .................. 10 2023 105 689.1

(51) Int. Cl.
 *F01N 3/20* (2006.01)
 *F01N 3/28* (2006.01)

(52) U.S. Cl.
 CPC ......... *F01N 3/2013* (2013.01); *F01N 3/2892* (2013.01)

(58) Field of Classification Search
 CPC ........ F01N 3/2013; F01N 3/2892; F01N 3/20; F01N 3/26; F01N 3/027; F01N 3/28; H05B 3/32; H05B 3/48; H05B 2203/003; H05B 2203/017; H05B 2203/022; F23G 7/00; F23J 15/08; F24H 3/00; F24H 3/0429; F28F 1/00

USPC .................................................. 60/300, 320
See application file for complete search history.

(56) References Cited

U.S. PATENT DOCUMENTS

| | | |
|---|---|---|
| 6,190,784 B1 | 2/2001 | Maus et al. |
| 2017/0254244 A1 | 9/2017 | Kurpejovic et al. |
| 2022/0026108 A1 | 1/2022 | Padberg et al. |
| 2022/0074333 A1* | 3/2022 | Hoeckel .............. H05B 3/32 |
| 2022/0290595 A1 | 9/2022 | Uysal et al. |
| 2023/0060816 A1 | 3/2023 | Hammer |
| 2023/0247726 A1* | 8/2023 | Uysal .................. H05B 3/06 219/541 |

FOREIGN PATENT DOCUMENTS

| | | |
|---|---|---|
| DE | 10 2016 107 213 A1 | 9/2017 |
| DE | 10 2020 123 376 A1 | 3/2022 |
| DE | 10 2021 122 086 A1 | 3/2023 |

(Continued)

*Primary Examiner* — Mark A Laurenzi
*Assistant Examiner* — Kelsey L Stanek
(74) *Attorney, Agent, or Firm* — Walter Ottesen, P.A.

(57) ABSTRACT

An exhaust gas heater for an exhaust gas system of an internal combustion engine includes a heating conductor. The heating conductor is constructed from flat material which is elongate in a heating-conductor longitudinal direction and has heating-conductor broad sides situated opposite one another in a heating-conductor thickness direction and heating-conductor flat sides situated opposite one another in a heating-conductor width direction. A plurality of formations, which follow one another in the heating-conductor longitudinal direction or/and follow one another in the heating-conductor width direction, are oriented substantially in the heating-conductor thickness direction and have varying formation heights in the heating-conductor width direction.

22 Claims, 3 Drawing Sheets

(56) References Cited

FOREIGN PATENT DOCUMENTS

| | | |
|---|---|---|
| DE | 10 2022 102 376 A1 | 8/2023 |
| EP | 3 795 920 A1 | 3/2021 |
| EP | 3 943 720 A1 | 1/2022 |
| EP | 4 060 169 A1 | 9/2022 |
| JP | H06264735 A | 9/1994 |
| JP | 2000512547 A | 9/2000 |

* cited by examiner

HEATING CONDUCTOR FOR AN EXHAUST GAS HEATER

CROSS-REFERENCE TO RELATED APPLICATIONS

This application claims priority of German patent application nos. 10 2023 103 941.5, filed Feb. 17, 2023, and 10 2023 105 689.1, filed Mar. 8, 2023, the entire contents of which are incorporated herein by reference.

TECHNICAL FIELD

The present disclosure relates to a heating conductor for an exhaust gas heater for an exhaust gas system of an internal combustion engine.

BACKGROUND

Such exhaust gas heaters are used in exhaust gas systems in order to heat a gas flowing in an exhaust gas system, for example the exhaust gas discharged by an internal combustion engine. In particular in a starting phase of the working operation of an internal combustion engine, in which the exhaust gas discharged thereby has a relatively low temperature, the heat taken up in the exhaust gas at a heating device can be transferred to a downstream exhaust-gas treatment arrangement or exhaust-gas aftertreatment arrangement, for example catalytic converter or particle filter. Consequently, quick heating of such an exhaust-gas treatment arrangement is achieved and it is possible to considerably shorten the period of time during which exhaust gas is discharged to the surrounding area without a for example catalytic cleaning process proceeding in the exhaust-gas treatment arrangement.

United States patent application US 2022/0074333 discloses an exhaust gas heater in which a heating conductor with a plurality of heating-conductor meander fields is formed. Meander sections which are radially staggered relative to one another extend substantially circumferentially in each heating-conductor meander field. The heating conductor is provided as a piece of material by cutting out from a metal flat material, which makes it possible to provide the heating conductor with a great degree of freedom in terms of the shaping of the individual heating-conductor meander fields or the meander sections in the individual heating-conductor meander fields.

United States patent application US 2023/0247726 discloses an exhaust gas heater for an exhaust gas system including heating conductors constructed from a sheet material. The heating conductors, which are arranged following one another in a main direction of exhaust gas flow and are provided by bending a strip-like flat material, have a respective meandering structure with meander longitudinal sections extending next to one another and meander connecting sections that connect meander longitudinal sections that follow one another. The heating conductors have a corrugated structure in the meander longitudinal sections. The heating conductors have their flat sides oriented upstream and/or downstream, with the result that the exhaust gas flowing around them flows along the broad sides of the heating conductors in the main direction of exhaust gas flow.

United States patent application US 2023/0060816 discloses an exhaust gas heater including a heating conductor which is constructed from flat material and has a fundamentally meandering structure, the broad sides of which are oriented upstream and/or downstream.

SUMMARY

An object of the present disclosure is to provide a heating conductor for an exhaust gas heater for an exhaust gas system of an internal combustion engine which has an increased stiffness together with a structurally simple configuration.

This object is, for example, achieved according to the disclosure by a heating conductor for an exhaust gas heater for an exhaust gas system of an internal combustion engine, the heating conductor being constructed from flat material which is elongate in a heating-conductor longitudinal direction and has heating-conductor broad sides situated opposite one another in a heating-conductor thickness direction and heating-conductor flat sides situated opposite one another in a heating-conductor width direction.

According to a first aspect of the present disclosure, a plurality of formations, which follow one another in the heating-conductor longitudinal direction or/and follow one another in the heating-conductor width direction, are oriented substantially in the heating-conductor thickness direction and have varying formation heights in the heating-conductor width direction, are provided on the heating conductor.

Such formations, which are formed with a varying formation height in the heating-conductor width direction, that is between the heating-conductor flat sides, have the effect of essentially stiffening the heating conductor, which is for example made from strip-like metal material. This has the result that vibrations occurring in a vehicle do not lead to the inducement of an oscillation effect in particular in the region of the eigenfrequency of the heating conductor, this on the one hand avoiding the occurrence of vibrational noises and on the other hand reducing the mechanical loading arising at the heating conductor or the carrier arrangement bearing it.

For efficient stiffening of the heating conductor, it is proposed that provision is made of at least one row of formations that follow one another in the heating-conductor longitudinal direction, preferably at substantially the same spacing from one another, and have an increasing formation height in the direction from a heating-conductor width center to one heating-conductor flat side of the two heating-conductor flat sides.

The formations may have a maximum formation height in the region of the heating-conductor flat side.

The stiffness of the heating conductor can be further increased in that provision is made of two rows of formations that follow one another in the heating-conductor longitudinal direction and have increasing formation heights in the direction from the heating-conductor width center to a respective heating-conductor flat side of the two heating-conductor flat sides, it being the case for a first row of the two rows that the formations that follow one another in the heating-conductor longitudinal direction have an increasing formation height in a direction toward a first heating-conductor flat side of the two heating-conductor flat sides and it being the case for a second row of the two rows that the formations that follow one another in the heating-conductor longitudinal direction have an increasing formation height in a direction toward a second heating-conductor flat side of the two heating-conductor flat sides.

In this case, for a symmetrical configuration with respect to the heating-conductor width center, it is possible for the formations of the first row to not be offset in the heating-conductor longitudinal direction with respect to the formations of the second row.

For even further increased stiffness, or a further reduced risk of the inducement of oscillation effects, it is proposed for the formations of the first row to be offset in the heating-conductor longitudinal direction with respect to the formations of the second row.

In an alternative embodiment, the formations may have a maximum formation height in the region of the heating-conductor width center, with the result that formations formed substantially like a bulge or a pot are provided in the region of the heating-conductor width center.

The formations may include at least one first formation oriented in a first direction in the heating-conductor thickness direction and at least one second formation oriented in a second direction, substantially opposite the first direction, in the heating-conductor thickness direction.

If such a structure is provided that, in the case of at least two formations that follow one another, one of the formations is a first formation and the other one of the formations is a second formation, it preferably being the case that first formations and second formations follow one another in alternation, it is possible to produce such an overall structure of a heating conductor in which the formations that follow one another form a corrugated, preferably sinusoidal, formation pattern.

In connection with the above-described offset, which may or may not be present, between formations arranged in the two rows, it should be noted that such an offset can be realized in that, where a formation is formed in one of the rows, no formation is formed in the other row, or a formation of the other type of the first and second types is formed. In an arrangement of the formations of the two rows without a mutual offset, where a formation of one type of the first and second types is formed in one of the rows, a formation of the same type is present in the other row.

According to a further embodiment aspect of the present disclosure that can be particularly advantageously realized in conjunction with the embodiment aspect set out above, but in principle also on its own leads to a considerably stiffer structure of a heating conductor, the heating conductor may include a plurality of heating-conductor layers which follow one another, preferably abut one another, in the heating-conductor thickness direction.

If, in the case of such a multilayered embodiment, at least two heating-conductor layers adjoin one another in a bending region formed on a heating-conductor flat side, it is also possible for the bending region that forms an integral component of the heating conductor to contribute to increasing the stiffness.

For the heating conductor constructed according to the disclosure, in order to be able to provide a large surface area for thermal interaction with this gas, for example exhaust gas, flowing around it, the heating conductor may have a meandering structure with a plurality of meander longitudinal sections, which extend next to one another, preferably substantially parallel to or/and substantially in a straight line in relation to one another, and arcuate meander connecting sections that connect meander longitudinal sections that follow one another to one another.

If no formation is provided in at least one meander connecting section, preferably any meander connecting section, the heating conductor can be bent particularly easily into the meandering structure without undefined distortions possibly caused in the process by formations occurring in a meander connecting section.

For example, it may be provided that the at least one heating conductor includes at least two heating-conductor meander fields, a first heating-conductor meander field of the at least two heating-conductor meander fields providing a connection region for connecting the at least one heating conductor to a voltage source and a second heating-conductor meander field of the at least two heating-conductor meander fields provides a further connection region for connecting the at least one heating conductor to the voltage source.

In the case of particularly easily implementable embodiments, all the heating-conductor meander fields may be provided by a single heating-conductor material piece, or at least two heating-conductor meander fields may be provided by separate heating-conductor material pieces. For the purpose of using the same parts, it is advantageous if at least two, preferably all the, heating-conductor meander fields provided by separate heating-conductor material pieces have substantially the same shape.

The disclosure also relates to an exhaust gas heater for an exhaust gas system of an internal combustion engine, including a carrier arrangement through which exhaust gas can flow substantially in the direction of an exhaust-gas-heater longitudinal axis and at least one heating conductor that has a structure according to the disclosure and bears the carrier arrangement.

In order to dam the flow as little as possible while providing as large as possible a surface area of the at least one heating conductor, it is proposed that the at least one heating conductor has its heating-conductor broad sides extending substantially in the direction of the exhaust-gas-heater longitudinal axis and has its heating-conductor flat sides extending substantially orthogonally to the exhaust-gas-heater longitudinal axis.

The carrier arrangement may include a carrier housing having a housing bottom, which is arranged on an axial side of the at least one heating conductor and extends substantially transversely to the exhaust-gas-heater longitudinal axis, a plurality of throughflow openings being provided in the housing bottom, and the at least one heating conductor being borne by a plurality of carrier elements on the housing bottom.

For the purpose of fixing in an exhaust gas system, the carrier housing may have a circumferential wall adjoining the housing bottom radially on the outside. To obtain a structurally fixed configuration with a good ability for flow to occur around the at least one heating conductor, it is advantageous if the carrier housing having the housing bottom and the circumferential wall has a cup-like form or/and the at least one heating conductor is substantially not covered by the carrier arrangement on its other axial side.

The disclosure also relates to an exhaust gas system for an internal combustion engine, including at least one exhaust-gas treatment unit, preferably catalytic converter or/and particle filter, and at least one exhaust gas heater constructed according to the disclosure upstream of the at least one exhaust-gas treatment unit in the main direction of exhaust gas flow.

BRIEF DESCRIPTION OF DRAWINGS

The invention will now be described with reference to the drawings wherein.

DETAILED DESCRIPTION

Figure 1:
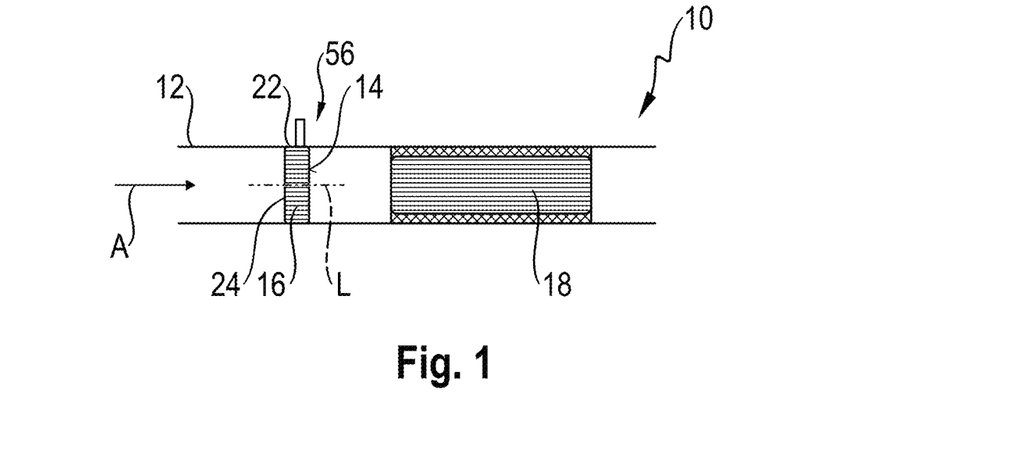
FIG. 1 shows a schematic illustration of an exhaust gas system for an internal combustion engine of a vehicle.

FIG. 1 shows a schematic illustration of a portion of an exhaust gas system 10 for an internal combustion engine in a vehicle. The exhaust gas system 10 includes an exhaust-gas guiding component 12, which is formed for example like a tube or a housing and in which the exhaust gas discharged from an internal combustion engine flows in a main direction of exhaust gas flow A. The exhaust gas flows toward an exhaust gas heater 14, which generates heat by applying an electrical voltage to a heating conductor 16 of same and transfers this heat to the exhaust gas, or the gas flowing through the exhaust gas system 10. The exhaust gas or gas transfers this heat further to a downstream exhaust-gas treatment unit 18, which may include a catalytic converter or/and particle filter or the like.

Figure 2:
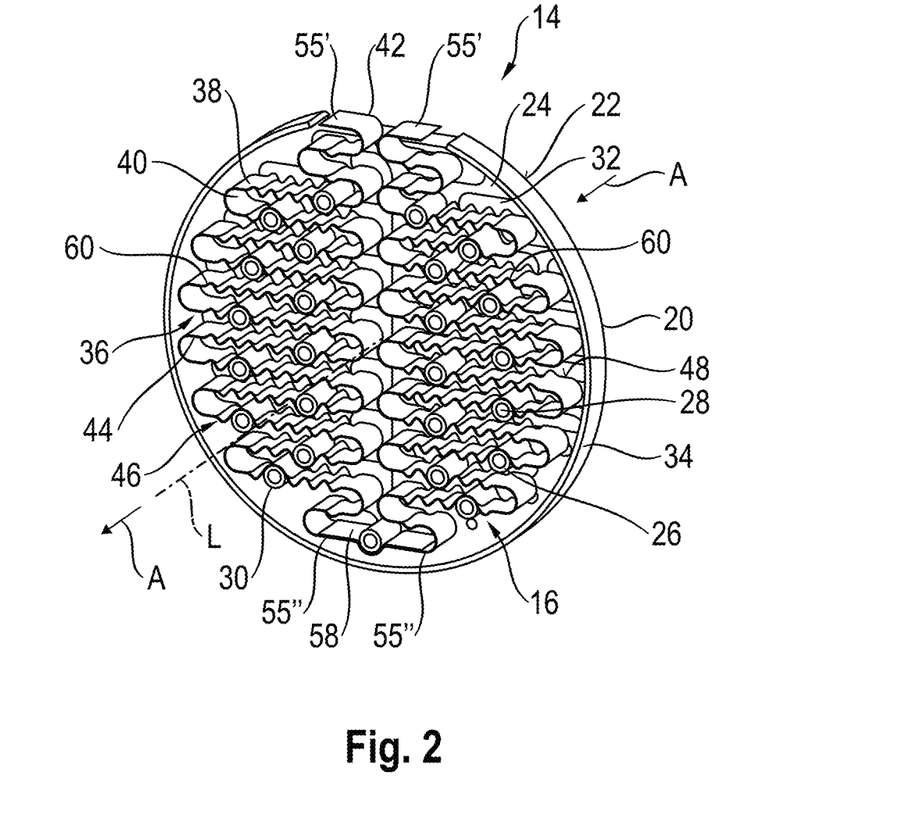
FIG. 2 shows a perspective view from a downstream side of an exhaust gas heater of the exhaust gas system of FIG. 1.

The exhaust gas heater 14 is illustrated in detail in FIG. 2. The exhaust gas heater 14 includes a carrier arrangement 22, which is constructed with a pot-like carrier housing 20 and which on one side bears the heating conductor 16 and on the other side is used to fix the exhaust gas heater 14 to the exhaust-gas guiding component 12. To this end, the carrier housing 20 has a housing bottom 24 which is oriented substantially orthogonally to an exhaust-gas-heater longitudinal axis L. The heating conductor 16 is fixedly borne by a plurality of carrier elements 26 on the housing bottom 24. The carrier elements 26 may each be fixed to the housing bottom 24 by a central pin 28, which is for example constructed from metal material, and may be fixed to the heating conductor 16 by a sleeve 30, which surrounds the pin 28 and may for example also be constructed using metal material. A layer of electrically insulating material may be arranged between the pin 28 and the sleeve 30 to avoid an electrical short circuit across the carrier elements 26. In order to allow the exhaust gas, intended to flow in the main direction of exhaust gas flow A or in the direction of the exhaust-gas-heater longitudinal axis L onto the carrier housing 20, to pass through the carrier arrangement 22, multiple for example elongate throughflow openings 32 are provided in the housing bottom 24.

The exhaust gas may for example first of all flow around the heating conductor 16, which is arranged on the upstream side of the housing bottom 24, and then flow through the throughflow openings 32 in the housing bottom 24 in a direction toward the exhaust-gas treatment unit 18. In the case of the advantageous arrangement depicted in FIGS. 1 and 2, the carrier housing 20 has its housing bottom 24 upstream of the heating conductor 16, and therefore the heating conductor 16 is directly opposite an upstream end face of the exhaust-gas treatment unit 18 and is not shielded by the housing bottom 24 and thus heat losses from the heating conductor 16 to the carrier housing 20 can be reduced. Heat radiation also discharged by the heating conductor 16 can therefore contribute to additionally heating the exhaust-gas treatment unit 18.

The carrier housing 20 also includes a circumferential wall 34 adjoining the housing bottom 24 radially on the outside, with the result that in principle a pot-like structure, which is open in the upstream direction, of the carrier housing 20 is produced. The circumferential wall 34 makes it possible to fix the exhaust gas heater 14 to the inner side of the exhaust-gas guiding component 12, for example by a material bond.

The heating conductor 16 is constructed from a flat material 36 provided for example by strip-like metal material. The flat material 36 has two flat sides 38, 40, which have a spacing from one another in a heating-conductor thickness direction $H_D$, also visible in FIG. 4, and extend in a heating-conductor width direction $H_B$, visible for example in FIG. 5. The flat material 36 also has two heating-conductor flat sides 42, 44, which have a spacing from one another in the heating-conductor width direction $H_B$ and are each oriented upstream or downstream. The exhaust gas, intended to flow in the main direction of exhaust gas flow A or in the direction of the exhaust-gas-heater longitudinal axis L onto the heating conductor 16, thus flows along the heating-conductor flat sides 38, 40, with the result that a large surface area for thermal interaction between the exhaust gas and the heating conductor 16 together with a relatively low flow resistance is provided.

Figure 3:
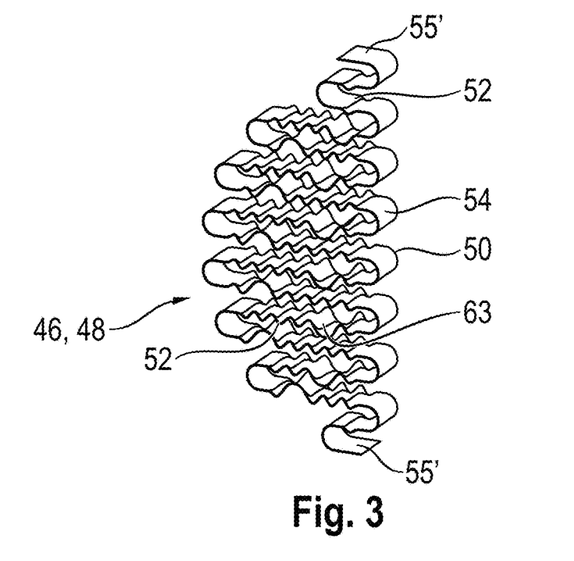
FIG. 3 shows a heating-conductor meander field, provided by a heating-conductor material piece, of the heating conductor of FIG. 2.

In the embodiment illustrated in FIG. 2, the heating conductor is constructed with two heating-conductor meander fields 46, 48. As can be seen in FIG. 3, each heating-conductor meander field 46, 48 is provided by a heating-conductor material piece 50. The two heating-conductor meander fields 46, 48 have the same shape, and therefore the same parts can be used to construct the heating conductor 16.

Each heating-conductor meander field 46, 48 is formed with a plurality of meander longitudinal sections 52, which extend substantially parallel to and substantially at a straight line in relation to one another and, in a respective meander connecting section 54, have their longitudinal end regions adjoining meander longitudinal sections 52 that follow in this series arrangement of meander longitudinal sections 52. In an end region of the heating-conductor meander fields 46, 48, a respective last meander longitudinal section 52 forms a connection region 55', in which a leadthrough 56, illustrated schematically in FIG. 1, makes electrically conductive contact with the heating conductor 16 for connection to a voltage source. In another end region, a respective last meander longitudinal section 52 forms a connection region 55", in which a connecting element 58, which can be seen in FIG. 2 and is for example plate-like, establishes a connection between the two heating-conductor meander fields 46, 48. The heating-conductor meander fields 46, 48 are thus connected in series.

In order to provide increased stiffness in the case of the heating conductor 16 made from relatively thin, flat material 36 and thus avoid the inducement of oscillation effects, a multiplicity of formations 60 are provided on the heating conductor 16, which is elongate in a heating-conductor longitudinal direction $H_L$. The formations 60 have a formation height $H_A$, which varies in the heating-conductor width direction $H_B$, in the heating-conductor thickness direction $H_D$, that is orthogonal to a plane formed by the heating-conductor width direction $H_B$ and the heating-conductor longitudinal direction $H_L$. A central region 62, substantially not shaped to provide the formations 60, in the region of a heating-conductor width center M can be considered to be a reference for the formation height $H_A$ of the formations 60.

Figure 5:
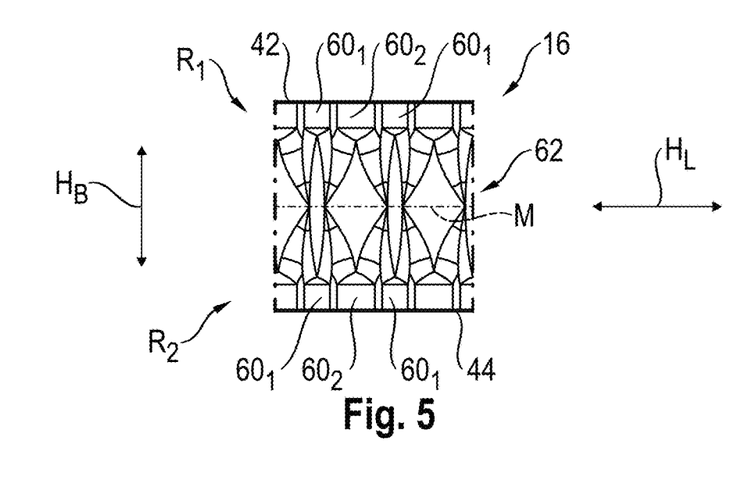
FIG. 5 shows a plan view of that section of the heating conductor that is illustrated in FIG. 4; and, FIG. 6 shows an end view of an alternative type of configuration for a heating conductor.

FIG. 5 depicts that, in the case of the illustrated embodiment of a heating conductor 16, provision is made of two rows $R_1$, $R_2$ of formations 60, it being the case that in the first row $R_1$ the formations 60 have an increasing formation height from the heating-conductor width center M to the first heating-conductor flat side 42 and in the second row $R_2$ the formations 60 have an increasing formation height from the heating-conductor width center M to the second heating-conductor flat side 44. In the two rows $R_1$, $R_2$, the formations 60 each have a maximum formation height $H_A$ on the heating-conductor flat sides 42, 44, that is, where there is the greatest spacing from the heating-conductor width center M.

Figure 4:
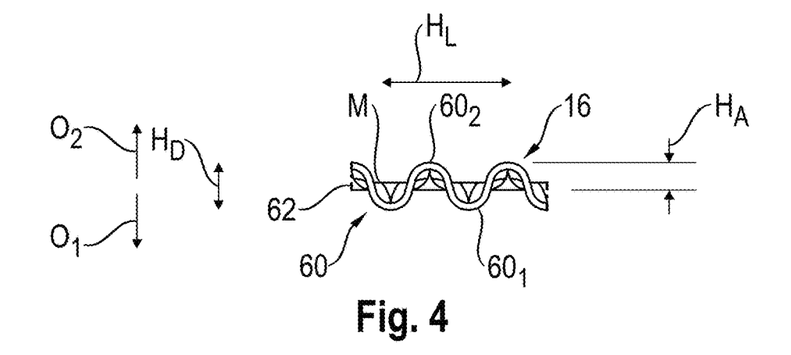
FIG. 4 shows a side view of a flat side of the heating conductor of FIG. 2.

It can be seen in FIG. 4 that the formations 60 have differing orientations in the heating-conductor thickness directions HD with respect to the reference defined in the region of the heating-conductor width center M by the central region 62. Formations 60 referred to as first formations 601 are oriented, or shaped with respect to the reference defined by the central region 62, in a first direction O1 in the heating-conductor thickness direction HD. Second formations 602 of the formations 60 are shaped with an orientation in a second direction O2, opposite the first direction O1, with respect to the central region 62. The first formations 601 and the second formations 602 are arranged following one another in alternation in the heating-conductor longitudinal direction HL and preferably at the same spacing, or the same longitudinal extent, in the heating-conductor longitudinal direction HL, with the result that in each of the two rows R1, R2 a respective corrugated structure of the first formations 601 and the second formations 602 and thus in particular also a corrugated structure of the heating-conductor flat sides 42, 44 is produced. For example, this corrugated structure may correspond to a substantially sinusoidal profile.

FIGS. 4 and 5 also depict that, in the two rows $R_1$, $R_2$, the first and second formations $60_1$, $60_2$ are substantially not offset in relation to one another in the heating-conductor longitudinal direction $H_L$. This means that, next to each first formation $60_1$ of the first row $R_1$ in the heating-conductor width direction $H_B$, there is also a first formation $60_1$ of the second row $R_2$ that is oriented in the same direction $O_1$. Correspondingly, a second formation $60_2$ of the second row $R_2$ follows each second formation $60_2$ of the first row $R_1$ in the heating-conductor width direction $H_B$.

By providing the heating conductor 16 with the respective formations 60, which are in the peripheral regions and have a formation height $H_A$ which varies in the heating-conductor width direction $H_B$, the heating conductor 16 is stiffened, with the result that the risk of the inducement of oscillation effects is avoided without additional material being introduced. At the same time, the formations 60 form flow conducting elements, which on the one hand provide an enlarged surface area for thermal interaction with the exhaust gas compared to a planar configuration of the heating conductor and on the other hand can ensure turbulence in the region of the surface of the heating conductor 16 that contributes to an enhanced thermal interaction of the exhaust gas with the heating conductor 16.

As can be seen in FIGS. 2 and 3, in the heating conductor 16 or the heating-conductor meander fields 46, 48 such formations 60 are provided substantially only in the region of the meander longitudinal sections 52, whereas such formations 60 are not provided in the meander connecting sections 54. This facilitates the operation of bending the flat material 36 into the meandering structure and avoids the risk of undefined distortion states occurring when bending in a region in which a formation 60 is to be produced.

It can also be seen in FIGS. 2 and 3 that where the heating conductor 16 is to be connected to the sleeves 30 of the carrier elements 26, bulges 63 which run through in the heating-conductor width direction $H_B$ and which the outer surfaces of the sleeves 30 can abut in order to be able to establish a stable connection, in particular by a material bond, are formed in the meander longitudinal sections. Similarly, it is also the case that no formations that impair the structural strength of the connection between the heating conductor 16 and the sleeves 30 are formed in the region of these bulges 63, which extend in the heating-conductor width direction $H_B$ with a substantially constant bulge height in the heating-conductor thickness direction $H_D$.

It should be noted that the heating conductor 16 could have a completely different form, in particular in terms of the configuration and positioning of the formations 60. Thus, in the two rows $R_1$, $R_2$ the formations 60 could be offset in relation to one another in the heating-conductor longitudinal direction $H_L$, with the result that for example a formation $60_2$ of the row $R_2$ follows each first formation $60_1$ in the first row $R_1$ in the heating-conductor width direction $H_B$. The formations 60 could also have varying lengths of extent in the heating-conductor longitudinal direction $H_L$. In a further alternative embodiment, such formations 60 could be formed in the central region 62, with the result that a multiplicity of dome-like or bulge-like formations is formed following one another in the heating-conductor longitudinal direction $H_L$.

As a deviation from the meandering structure presented, the heating conductor 16 could also have a different profile, for example a helical profile, about the exhaust-gas-heater longitudinal axis L. In principle, it should be noted that the exhaust gas heater 14 may have multiple such heating conductors 16 arranged following one another in the direction of the exhaust-gas-heater longitudinal axis L.

Although the above-described structure of a heating conductor makes it possible to obtain a stiff structure which can be realized easily in structural terms, if the flat material used is relatively thin, strip-like metal material which is bent into the desired shape, that is, a material which has a width in the heating-conductor width direction that is considerably greater than its thickness in the heating-conductor thickness direction, for example the width is at least 5-80 times the thickness, the heating conductor may for example also be produced by cutting out from a thin, plate-like metal material. The heating conductor produced with a defined structure, for example also the heating-conductor meander fields explained above, by cutting out from a thin metal plate then has a length of extent in the heating-conductor thickness direction corresponding to the thickness of the plate-like metal material and has a length of extent in the heating-conductor width direction that is produced orthogonally to this thickness by shaping during the cutting-out operation. Such a heating conductor is positioned in the carrier arrangement in such a way that its heating-conductor broad sides are oriented upstream and/or downstream, that is, substantially orthogonally to the exhaust-gas-heater longitudinal direction, whereas the heating-conductor flat sides are oriented in the exhaust-gas-heater longitudinal direction. In the case of such a heating conductor produced by cutting out from a thin metal plate, the formations can be created by shaping the heating conductor, it being possible to perform this shaping for example at the same time as the heating conductor is cut out from the metal plate by punching.

Figure 6:
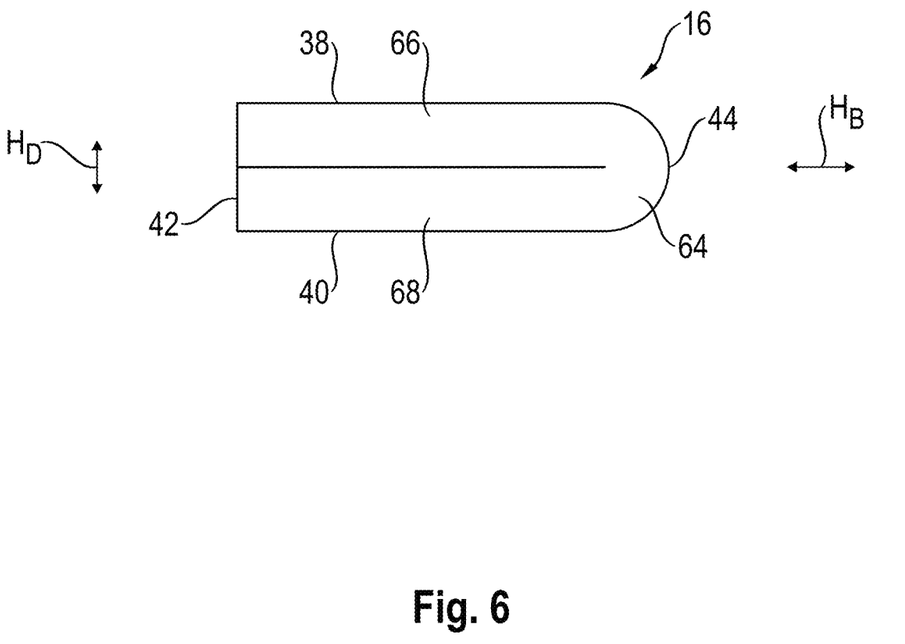

FIG. 6 depicts a further alternative embodiment of such a heating conductor 16 constructed from flat material 36. In the embodiment illustrated in FIG. 6, the heating conductor 16 has a multilayered, in particular two-layered, form. This is achieved in that the flat material 36 is fundamentally provided with a length of extent in the heating-conductor width direction $H_B$ that corresponds to twice the width of the finished heating conductor 16. The flat material 16 is then folded or bent in a central region, with the result that for example a bending region 64, in which the two layers 66, 68 of the heating conductor 16 integrally adjoin one another, is formed on the second flat side 44 oriented upstream. The layer 66 provides the first heating-conductor broad side 38 in the heating conductor 16 and the other layer 68 provides the second heating-conductor broad side 40.

It is also the case for such a multilayered configuration of the heating conductor 16 that a relatively high stiffness that substantially rules out the inducement of oscillation effects is achieved in spite of the use of flat material 36 to construct same. The fact that the two layers 66, 68 are attached to one another by a distortion region 64 providing an integral component of the heating conductor 16 in particular also contributes to this.

In an alternative embodiment, the two layers 66, 68 could also be provided as separate components which can be connected to one another by a material bond, for example soldering or welding or adhesive bonding, or/and by a form fit, for example by crimping.

It should also be noted that, to further increase the stiffness of the heating conductor 16 in the multilayered embodiment of the heating conductor 16 illustrated in FIG. 6, the formations 60 described above in relation to FIGS. 2 to 5 can similarly be provided.

The effect of the above-described structure of the heating conductor having formations, the formation height of which varies in the heating-conductor width direction or/and having a multilayered structure is not only increased stiffness for preventing the inducement of oscillation effects but also increased strength with respect to deformations caused by thermally induced changes in length.

It is understood that the foregoing description is that of the preferred embodiments of the invention and that various changes and modifications may be made thereto without departing from the spirit and scope of the invention as defined in the appended claims.

The invention claimed is:

1. A heating conductor for an exhaust gas heater for an exhaust gas system of an internal combustion engine, the heating conductor comprising:
   said heating conductor being made from flat material elongated in a heating-conductor longitudinal direction;
   said heating conductor having heating-conductor broad sides disposed opposite one another in a heating-conductor thickness direction and having heating-conductor flat sides disposed opposite one another in a heating-conductor width direction; and,
   a plurality of formations being provided on said heating conductor and at least one of the following applies:
   i) said plurality of formations follow one another in said heating-conductor longitudinal direction; and,
   ii) said plurality of formations follow one another in said heating-conductor width direction; and,
   said plurality of formations being orientated in said heating-conductor thickness direction and having varying formation heights in said heating-conductor width direction;
   wherein:
   at least one row of formations of said plurality of formations following one another in said heating-conductor longitudinal direction is provided; and
   said formations of said at least one row of formations, for forming a corrugated formation pattern, have an increasing formation height in the direction from a heating-conductor width center to one of said heating-conductor flat sides of said heating-conductor flat sides with a maximum formation height in a region of said one of said heating-conductor flat sides.

2. The heating conductor of claim 1, wherein:
   two of said rows of formations following one another in said heating-conductor longitudinal direction and having increasing formation heights in the direction from said heating-conductor width center to a respective heating-conductor flat side of said heating-conductor flat sides are provided;
   in a first row of formations of said two rows of formations, said formations that follow one another in the heating-conductor longitudinal direction have an increasing formation height in a direction toward a first heating-conductor flat side of said heating-conductor flat sides; and,
   in a second row of formations of said two rows of formations, said formations that follow one another in the heating-conductor longitudinal direction have an increasing formation height in a direction toward a second heating-conductor flat side of the heating-conductor flat sides.

3. The heating conductor of claim 2, wherein said formations of the first row of formations are not offset in said heating-conductor longitudinal direction with respect to said formations of said second row of formations.

4. The heating conductor of claim 2, wherein said formations of the first row of formations are offset in the heating-conductor longitudinal direction with respect to the formations of the second row.

5. The heating conductor of claim 1, wherein said plurality of formations have at least one first formation oriented in a first direction in said heating-conductor thickness direction and at least one second formation oriented in a second direction opposite said first direction in the heating-conductor thickness direction.

6. The heating conductor of claim 5, wherein, at least in two formations of said plurality of formations that follow one another, one is a first formation and the other one is a second formation and said first formation and said second formation follow one another in alternation.

7. The heating conductor of claim 1, wherein the plurality of formations that follow one another form a sinusoidal formation pattern.

8. The heating conductor of claim 1, wherein the heating conductor comprises a plurality of heating-conductor layers which follow one another in the heating-conductor thickness direction.

9. The heating conductor of claim 8, wherein at least two heating-conductor layers of said plurality of heating-conductor layers adjoin one another in a bending region formed on a heating-conductor flat side.

10. The heating conductor of claim 1, wherein the heating conductor comprises a plurality of heating-conductor layers which follow one another and abut one another in the heating-conductor thickness direction.

11. The heating conductor of claim 1, wherein said heating conductor has a meandering structure with a plurality of meander longitudinal sections extending next to one another and arcuate meander connecting sections connecting meander longitudinal sections that follow one another to one another.

12. The heating conductor of claim 11, wherein said plurality of meander longitudinal sections extending next to one another are parallel and/or in a straight line in relation to one another.

13. The heating conductor of claim 11, wherein no formation is provided in at least one meander connecting section of said arcuate meander connecting sections.

14. The heating conductor of claim 11, wherein the at least one heating conductor comprises at least two heating-conductor meander fields, a first heating-conductor meander field of the at least two heating-conductor meander fields providing a connection region for connecting the at least one heating conductor to a voltage source and a second heating-conductor meander field of the at least two heating-conductor meander fields providing a further connection region for connecting the at least one heating conductor to the voltage source.

15. The heating conductor of claim 14, wherein all the heating-conductor meander fields are provided by a single heating-conductor material piece, or wherein at least two heating-conductor meander fields of said at least two heating-conductor meander fields are provided by separate heating-conductor material pieces.

16. The heating conductor of claim 15, wherein at least two of the heating-conductor meander fields of said at least two heating-conductor meander fields provided by separate heating-conductor material pieces have the same shape.

17. The heating conductor of claim 1, wherein, in said at least one row of formations, said formations follow one another at a predetermined spacing from one another.

18. An exhaust gas heater for an exhaust gas system of an internal combustion engine, the exhaust gas heater defining an exhaust-gas heater longitudinal axis and comprising:
- a carrier arrangement through which exhaust gas can flow in a direction of said exhaust-gas-heater longitudinal axis; and,
- at least one heating conductor supported on said carrier arrangement;
- said at least one heating conductor being made from flat material elongated in a heating-conductor longitudinal direction;
- said at least one heating conductor having heating-conductor broad sides disposed opposite one another in a heating-conductor thickness direction and having heating-conductor flat sides disposed opposite one another in a heating-conductor width direction; and,
- a plurality of formations being provided on said at least one heating conductor and at least one of the following applies:
- i) said plurality of formations follow one another in said heating-conductor longitudinal direction; and,
- ii) said plurality of formations follow one another in said heating-conductor width direction; and,
- said plurality of formations being orientated in said heating-conductor thickness direction and having varying formation heights in said heating-conductor width direction;
- wherein:
- at least one row of formations of said plurality of formations following one another in said heating-conductor longitudinal direction is provided; and,
- said formations of said at least one row of formations, for forming a corrugated formation pattern, have an increasing formation height in the direction from a heating-conductor width center to one of said heating-conductor flat sides of said heating-conductor flat sides with a maximum formation height in a region of said one of said heating-conductor flat sides.

19. The exhaust gas heater of claim 18, wherein the at least one heating conductor has the heating-conductor broad sides thereof extending in a direction of the exhaust-gas heater longitudinal axis and has the heating-conductor flat sides thereof extending orthogonally to the exhaust-gas heater longitudinal axis.

20. The exhaust gas heater of claim 18, wherein the carrier arrangement comprises a carrier housing having a housing bottom arranged on an axial side of the at least one heating conductor and extending transversely to the exhaust-gas-heater longitudinal axis, a plurality of throughflow openings being provided in the housing bottom, and the at least one heating conductor being borne by a plurality of carrier elements on the housing bottom.

21. The exhaust gas heater of claim 20, wherein the carrier housing has a circumferential wall adjoining the housing bottom radially on an outside, the carrier housing having the housing bottom and the circumferential wall having a cup-like form or/and the at least one heating conductor being not covered by the carrier arrangement on its other axial side.

22. An exhaust gas system for an internal combustion engine, comprising:
- at least one exhaust-gas treatment unit and at least one exhaust gas heater upstream of the at least one exhaust-gas treatment unit in a main direction of exhaust gas flow;
- the exhaust gas heater defining an exhaust-gas longitudinal axis and including:
- a carrier arrangement through which exhaust gas can flow in a direction of said exhaust-gas-heater longitudinal axis; and,
- at least one heating conductor supported on said carrier arrangement;
- said at least one heating conductor being made from flat material elongated in a heating-conductor longitudinal direction;
- said at least one heating conductor having heating-conductor broad sides disposed opposite one another in a heating-conductor thickness direction and having heating-conductor flat sides disposed opposite one another in a heating-conductor width direction; and,
- a plurality of formations being provided on said at least one heating conductor and at least one of the following applies:
- i) said plurality of formations follow one another in said heating-conductor longitudinal direction; and,
- ii) said plurality of formations follow one another in said heating-conductor width direction; and,
- said plurality of formations being orientated in said heating-conductor thickness direction and having varying formation heights in said heating-conductor width direction;
- wherein:
- at least one row of formations of said plurality of formations following one another in said heating-conductor longitudinal direction is provided; and,
- said formations of said at least one row of formations, for forming a corrugated formation pattern, have an increasing formation height in the direction from a heating-conductor width center to one of said heating-conductor flat sides of said heating-conductor flat sides with a maximum formation height in a region of said one of said heating-conductor flat sides.

\* \* \* \* \*